D. De GARMO.
Stovepipe Damper.
No. 61,613.
Patented Jan. 29, 1867.
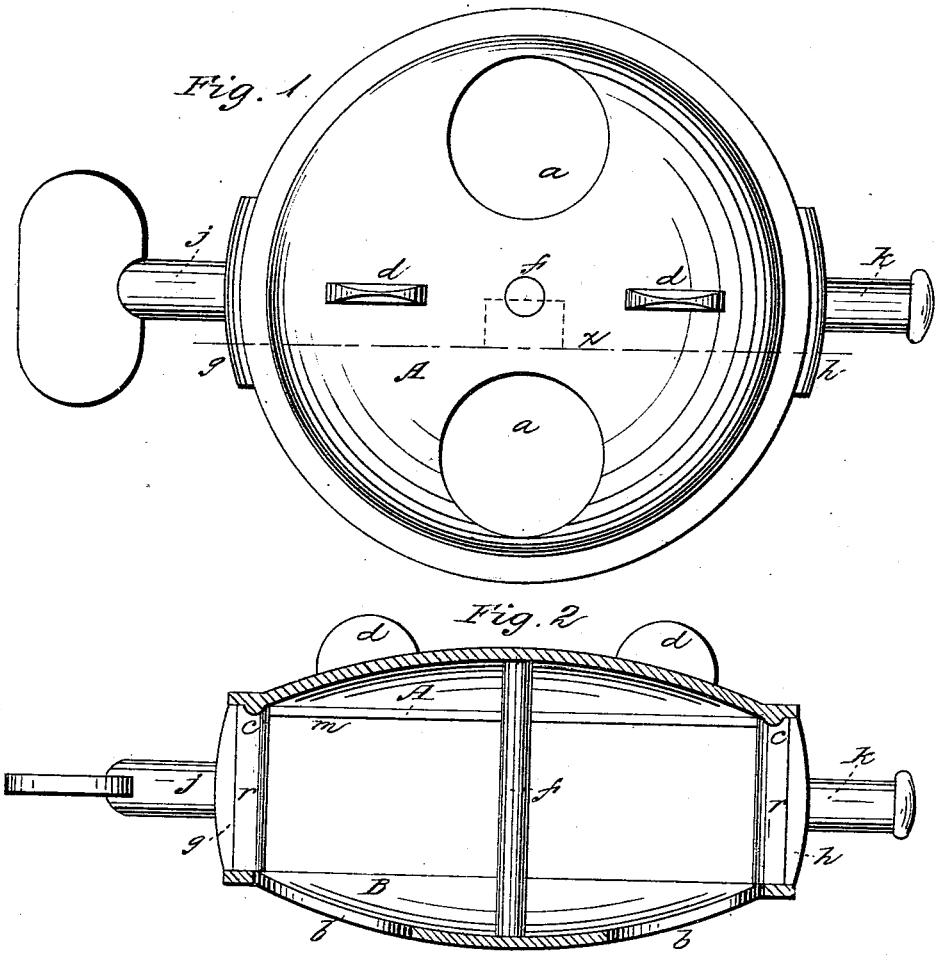
Witnesses
Daniel Crennell
Wm. S. Loughborough
Inventor
D. DeGarmo

United States Patent Office.

DANIEL DE GARMO, OF ROCHESTER, NEW YORK.

Letters Patent No. 61,613, dated January 29, 1867.

---

IMPROVEMENT IN STOVE-PIPE DAMPERS.

---

The Schedule referred to in these Letters Patent and making part of the same.

---

TO ALL WHOM IT MAY CONCERN:

Be it known that I, DANIEL DE GARMO, of Rochester, in the county of Monroe, and State of New York, have invented certain new and useful improvements in "Stove-Pipe Dampers;" and I do hereby declare that the following is a full, clear, and exact description thereof, reference being had to the accompanying drawings, making part of this specification, in which—

Figure 2 is a sectional view of my invention, in the direction of the red line $x$, fig. 1.

Figure 1 is a top or face view of the same.

This invention consists in providing a simple and cheap stove-pipe damper, which may be regulated or adjusted to suit chimneys or pipes having a greater or a less draught, which feature permits the damper to be used in pipes having but a very light draught.

To enable others to make and use my invention I will describe its construction and operation.

The two spherical plates A and B are each provided with suitable openings, $a$ and $b$, to prevent the entire obstruction of the smoke and gases, when the damper is turned square across. The plate B is provided on two opposite sides with lugs, $g$ and $h$, to which the axial bearings or journals $j$ and $k$ are cast. These lugs have each a brace or rib, $r$, in the outer end of which is formed a recess, $c$, to receive the circular rim $m$ of the plate A. The plates A and B are cast with a countersunk hole in the centre, and they are securely held together by means of the pivot-bolt or rivet $f$, and at the same time the plate A may be rotated upon that axis, so as to cause the openings $a$ to register to the openings $b$, or partially so, or so that $a\ a$ shall be opposite to the spaces between $b\ b$. The latter adjustment would be proper for a damper to be used in a pipe having a very strong draught, and the other adjustments to a less draught. There may be a slight recess in one of the lugs, and corresponding points so arranged upon the plate A as to retain the plates in any desired adjustment. If the plates should be made in one casting, the pivot $f$ would not be required. The lugs are greatly strengthened by the rib or rim $m$ resting in the recess $c$. The lips $d$, on plate A, are provided for convenience in changing the relative adjustment of the plates A and B when the damper is being placed in the pipe. The plates are made in an ordinary two-part flask, and so as to match each other without any subsequent fitting.

What I claim as my invention, and desire to secure by Letters Patents, is—

The arrangement, in stove-pipe dampers, of the plates A and B, journals $j\ k$, rib or rim $m$, and recesses $c$, pivot bolt $f$, and openings $a\ b$, in the manner and for the purposes set forth.

D. DE GARMO.

Witnesses:
DANIEL CRENNELL,
WM. S. LOUGHBOROUGH.